(12) United States Patent
Mayerle et al.

(10) Patent No.: US 6,289,830 B2
(45) Date of Patent: Sep. 18, 2001

(54) NURSE INDUCTOR APPARATUS FOR AIR SEEDERS

(75) Inventors: Dean J. Mayerle; David R. Hundeby; Ronald N. Engen; George Neufeld, all of Saskatoon (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/794,139

(22) Filed: Feb. 28, 2001

Related U.S. Application Data (62) Division of application No. 09/433,719, filed on Oct. 4, 1999.
(60) Provisional application No. 60/107,154, filed on Nov. 5, 1998, now abandoned.

(51) Int. Cl.[7] .................................................. A01C 7/04
(52) U.S. Cl. ........................................... 111/174; 111/900
(58) Field of Search ....................... 111/900, 915, 111/120, 121, 14, 170, 174, 185, 184, 183

(56) References Cited

U.S. PATENT DOCUMENTS

| | | | |
|---|---|---|---|
| 3,490,654 | * | 1/1970 | Fischer ................................ 222/193 |
| 4,060,181 | * | 11/1977 | Grataloup ............................. 222/193 |
| 4,779,765 | * | 10/1988 | Neumeyer ............................ 222/142 |
| 5,156,102 | * | 10/1992 | Andersen .............................. 111/175 |
| 5,161,473 | * | 11/1992 | Landphair et al. ................... 111/176 |
| 5,915,312 | * | 6/1999 | Meyer et al. ......................... 111/174 |

* cited by examiner

*Primary Examiner*—Christopher J. Novosad
(74) *Attorney, Agent, or Firm*—Larry W. Miller; J. William Stader (57) ABSTRACT

A nurse inductor mechanism for an agricultural seeding implement converts an air seeder meter box into a nurse inductor box to convey seed particles to the singulator of a planting mechanism. The nurse inductor mechanism is detachably mounted on the meter box of the air seeder to receive a supply of seed particles therefrom. The nurse induction mechanism intercepts the normal air flow for the metering mechanism to divert the stream of air into engagement with a pile of seed particles and induce the entrainment of the seed particles for conveyance thereof to the remote planting mechanism. A partition wall divides the nurse induction mechanism into a seed side and an air side. The seed side receives the supply of seed particles from the hopper and allows the seed to pass through a passageway into the air side for engagement by the stream of air. Divider walls are provided to isolate each discharge tube from the other discharges tube so that the planter mechanisms can provide a continuous supply of seed particles. The discharge tubes pass through the nurse induction mechanism in a stacked pair, modular configuration with the respective discharge tubes being adequately separated with respect to the seed side to permit the passage of seed particles therebetween.

14 Claims, 14 Drawing Sheets

Figure 18c

NURSE INDUCTOR APPARATUS FOR AIR SEEDERS

CROSS REFERENCE TO RELATED APPLICATIONS

This application is a divisional application of U.S. application Ser. No. 09/433,719., filed Oct. 4, 1999, now pending, which claims priority to U.S. Provisional Application Ser. No. 60/107,154, filed Nov. 5, 1998 (abandoned). The entirety of each of these applications is incorporated herein by reference.

BACKGROUND OF THE INVENTION

This invention relates generally to air seeders for planting seeds in the ground in an agricultural environment and, more specifically, to a nurse inductor systemco-operable with a planter mechanism to feed seed or other particulate material to a planting mechanism for insertion of that material into the ground.

As the size of agricultural implements continues to grow, the versatility of such implements becomes more significant. Large air seeders have become increasingly popular for the planting of seeds, fertilizer and other product without strict regard for the exact placement of the seeds particles. For crop planting operations that require seed singulation, nurse systems are used to feed seed or other particles from larger hoppers into smaller reservoirs located at the singulators. A nurse inductor system enables an air cart typically used for dryland farming, (cereal crops, etc.), to be adapted for use in row crop planting applications, such as corn and soybean, though not limited to soybean and corn. A nurse inductor system can be used to enable a farmer to singulate on-row, with one central hopper filling location, and to plant more acres before having to stop to fill the central hopper again, resulting in quicker planting and less labor, while maintaining the precision spacing available by on-row singulation.

In U.S. Pat. No. 5,161,473, a nurse system is disclosed which works off a specialized cart. The air comes into the seed delivery area coaxial with the seed tube that takes the air and seed to the row units. With this system substantial energy is used to nurse the seed since the air changes direction abruptly. This particular nurse system provides a dedicated fan to feed the 12 rows to be planted from the nurse system. This system requires the adding or removing of shims to adjust line length, which is difficult and inconvenient to accomplish. U.S. Pat. No. 5,156,102 and U.S. Pat. No. 4,060,181 teach other nurse embodiments.

SUMMARY OF THE INVENTION

It is an object of this invention to provide a nurse inductor system operable for use with planters requiring singulation of the seeds for planting in the ground.

It is a feature of this invention that the nurse inductor system enables the use of an existing air cart for nursing individual planter units in a passive manner.

It is an advantage of this invention that the nursing system would not require the addition of active controls for the nurse induction mechanism, the system being self-regulating without any external electronic control systems being necessary.

It is another feature of this invention that replacement of existing components on a conventional air cart with nurse induction components, to convert the standard air cart without requiring permanent modifications to the cart.

It is another advantage of this invention that the induction of seed or other particulate product is accomplished more evenly and consistently, thereby reducing the possibility of a plugging of the lines.

It is yet another feature of this invention that bridging in the hopper side of the induction unit is avoided by increasing the room for particulate material to flow.

It is still another advantage of this invention that the air pressure and flow required by the nurse induction system is reduced, so that the existing fan on an air cart can be used for both nurse induction of seeds and the application of particles from one of more other air cart hopper(s) at the same time.

It is still another feature of this invention that the wings of the planter toolbar can be folded without the need to empty particles out of the planter seed reservoir before folding.

It is yet another advantage of this invention that the planter can be folded with the wings pivoted closer to the first row unit on the wing section of the planter row unit without interference between the planter seed reservoirs.

It is yet another advantage of this invention that more than one planter singulator can be fed with one nurse inductor line, thus enabling the development of a wider planter toolbar with substantially more planter units than previously available.

It is a further advantage of this invention that the nurse inductor mechanism can be used on an air cart that may also be used in dryland farming.

It is still a further object of this invention to provide nurse inductor mechanism for an agricultural seeding implement which is durable in construction, inexpensive of manufacture, carefree of maintenance, facile in assemblage, and simple and effective in use.

These and other objects, features and advantages can be accomplished according to the instant invention by a nurse inductor mechanism for an agricultural seeding implement in which the nurse inductor mechanism converts an air seeder meter box into a nurse inductor box to convey seed particles to the singulator of a planting mechanism. The nurse inductor mechanism is detachably mounted on the meter box of the air seeder to receive a supply of seed particles therefrom. The nurse induction mechanism utilizes the normal air flow for the metering mechanism and diverts the stream of air into engagement with a pile of seed particles and induce the entrainment of the seed particles for conveyance thereof to the remote planting mechanism. A partition wall divides the nurse induction mechanism into a seed side and an air side. The seed side receives the supply of seed particles from the hopper and allows the seed to pass through a passageway into the air side for engagement by the stream of air. Divider walls are provided to isolate each discharge tube from the other discharges tube so that the planter mechanisms can provide a continuous supply of seed particles. The discharge tubes pass through the seed side of the nurse induction mechanism in a stacked pair, modular configuration with the respective discharge tubes being adequately separated to permit the passage of seed particles therebetween.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a perspective view of the particle hopper side of the nurse induction unit, with the exterior induction box wall removed, the nurse distribution lines being oriented in vertical pairs to leave open space between the lines for the particles to pass through;

FIGS. 18 a–d are perspective, side and front elevational, and top plan views of the nurse system receiver header assembly vent.

DETAILED DESCRIPTION OF THE PREFERRED EMBODIMENT

Referring first to FIGS. 1–4, the principles of the nurse induction apparatus can best be seen. The nurse induction adapter is mounted on a conventional air seeder, air cart, and redirects the air stream 13 coming from the fan 11 in an air cart box 16 into a path that leads through the nurse inductor 20. The air stream is guided into a nozzle region 30 that directs the air along a flow path that tangentially engages a pile of seed particles S exiting the opening 19 at the bottom of the seed hopper 12. The turbulence of the blast of air from the nozzle 30 loosens the seed particles from this assemblage of seed particles S exiting the opening 19 in the bottom of the seed hopper 12, entraining the individual seed particles into the air stream as it follows a path to the distribution lines 22 above the seed particle pile. The individual seed particles remain suspended in the air stream where the air bleeds off and the individual seed particles fall by gravity into a second pile or mass at the planting mechanism.

As best seen in FIGS. 3–7, the air stream 13 through the nurse inductor apparatus 20 is split at the general location of the seed particle mass at the bottom of the central seed hopper 12 on the air cart 10 into individual sections 31 that are isolated by generally vertical walls 32. Each individual section 31 leads to a different seed distribution tube 22 and, ultimately, to a different receiver header 45 and associated receivers 40. The nurse inductor 20 induces seed particles into the air stream when and where there is demand for the particles. The demand for particles is controlled by the level of product in each respective receiver on the output end of the seed distribution tube. When the receiver 40 is full, air is restricted from escaping from the seed distribution tube by the massed seed particles within the seed distribution tube. As a result of the filled receiver 40, which prevents the passage of air there through, the air flow and air velocity reduce due to increased pressurization of the line. This resultant reduction in potential air pressure reduces the capacity of the flow of air to induce the seed particles into the corresponding seed distribution tube 22. Since the flow of air through the nurse inductor 20 is spread across the entire unit, the flow of air will tend to go to the lines that have open receivers because of the less airflow resistance.

Figure 3:
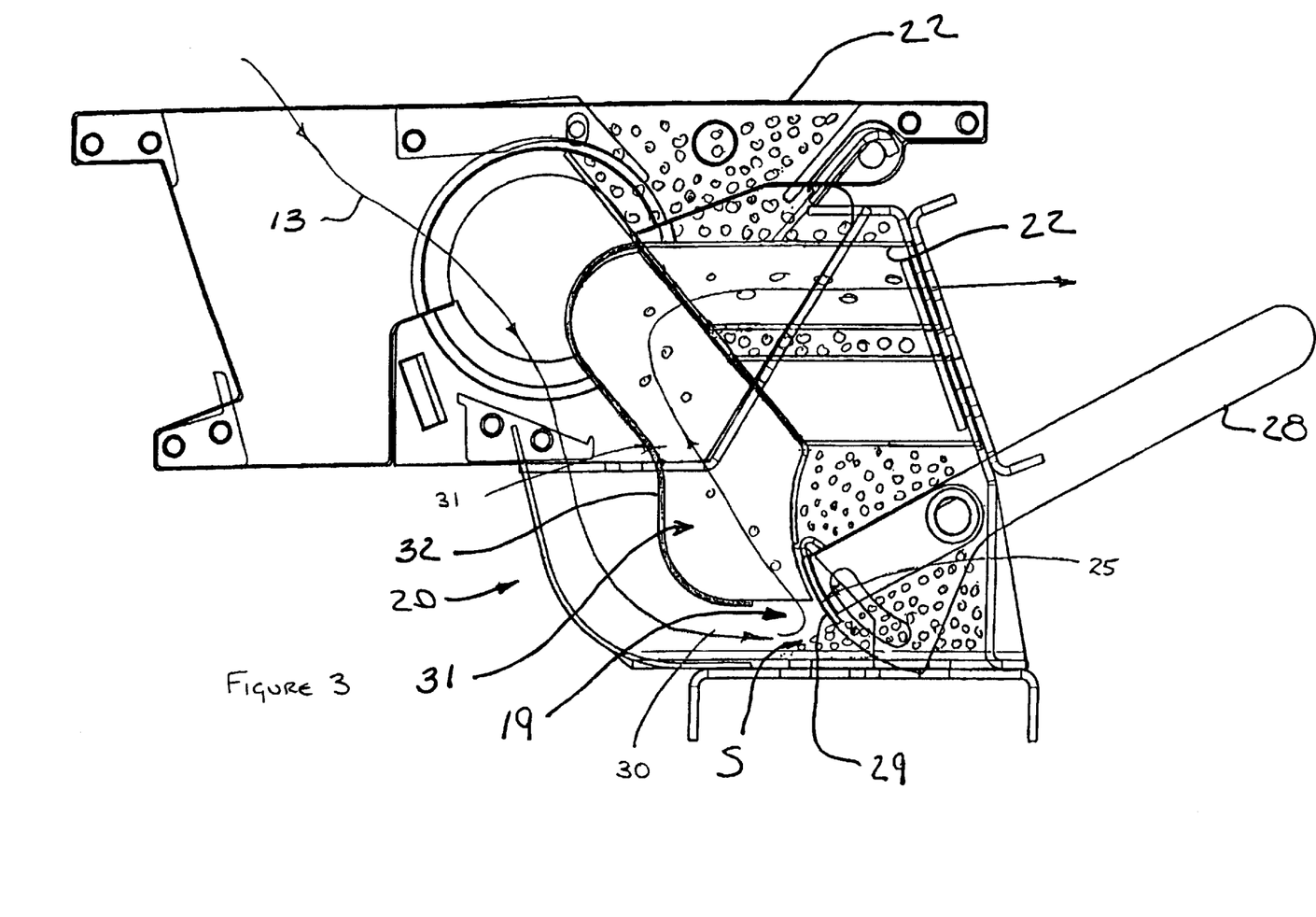
FIG. 3 is an enlarged schematic cross-sectional view of the nurse induction mechanism shown in FIG. 2 to depict the flow of air and seed through the uppermost seed distribution tubes leading to the planting mechanism, the arrows depicting the direction of air flow through the mechanism.
Figure 4:
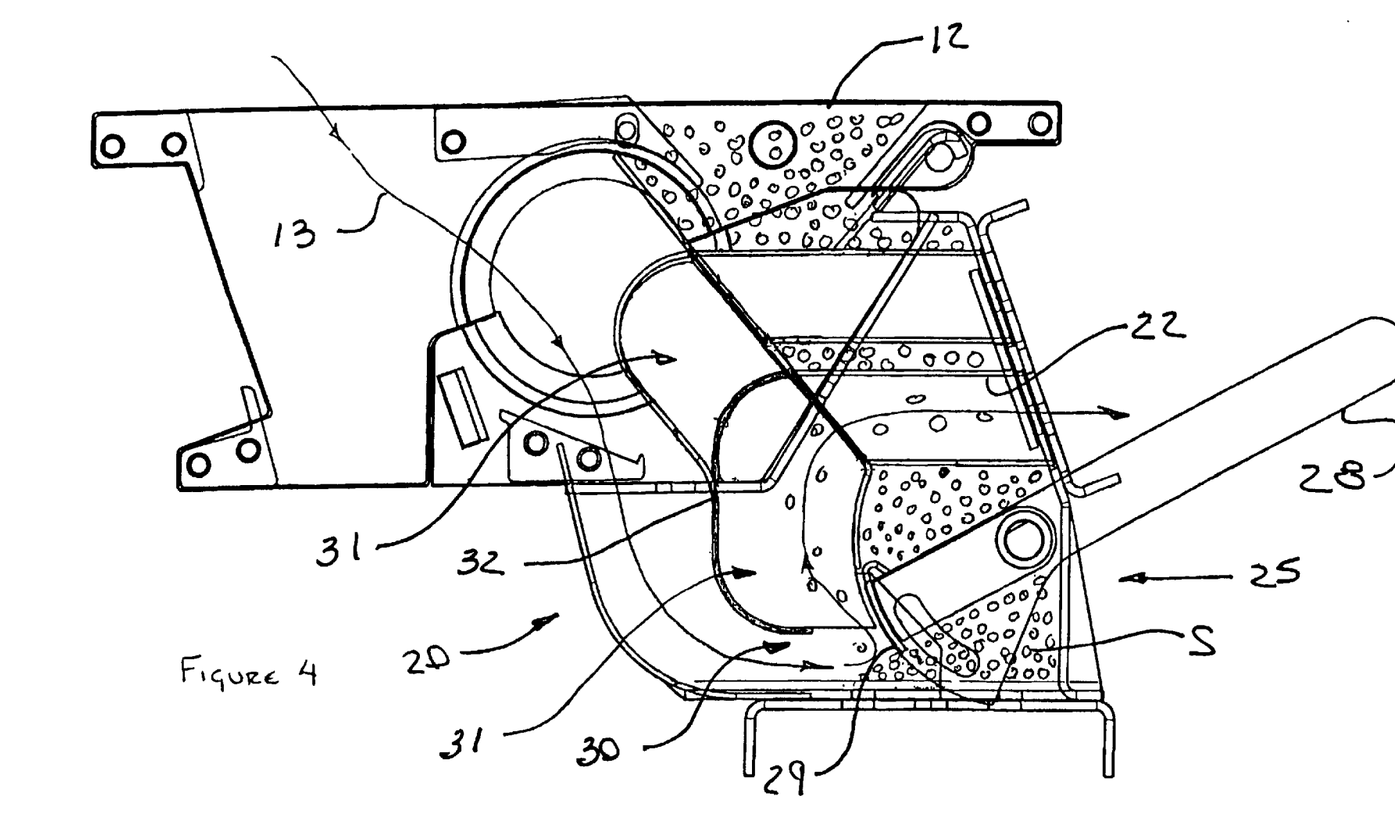
FIG. 4 is an enlarged schematic cross-sectional view similar to that of FIG. 3 except depicting the flow of air and seed through the lowermost seed distribution tubes to the corresponding planting mechanism, the arrows depicting the direction of air flow through the mechanism.
Figure 5:
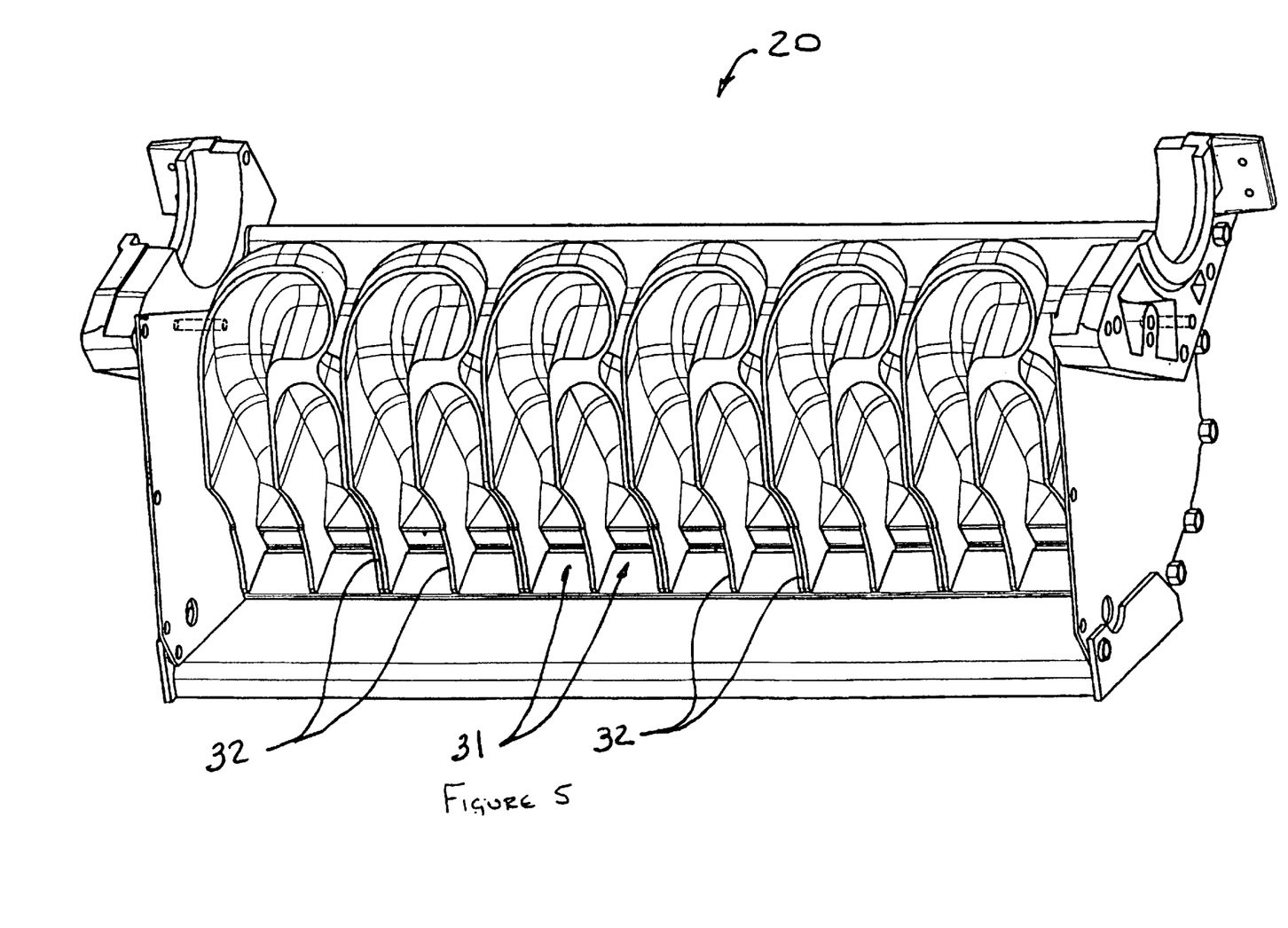
FIG. 5 is a perspective view of the divider wall portion of the nurse induction apparatus to depict the divider walls separating the uppermost and lowermost seed distribution tubes.
Figure 6:
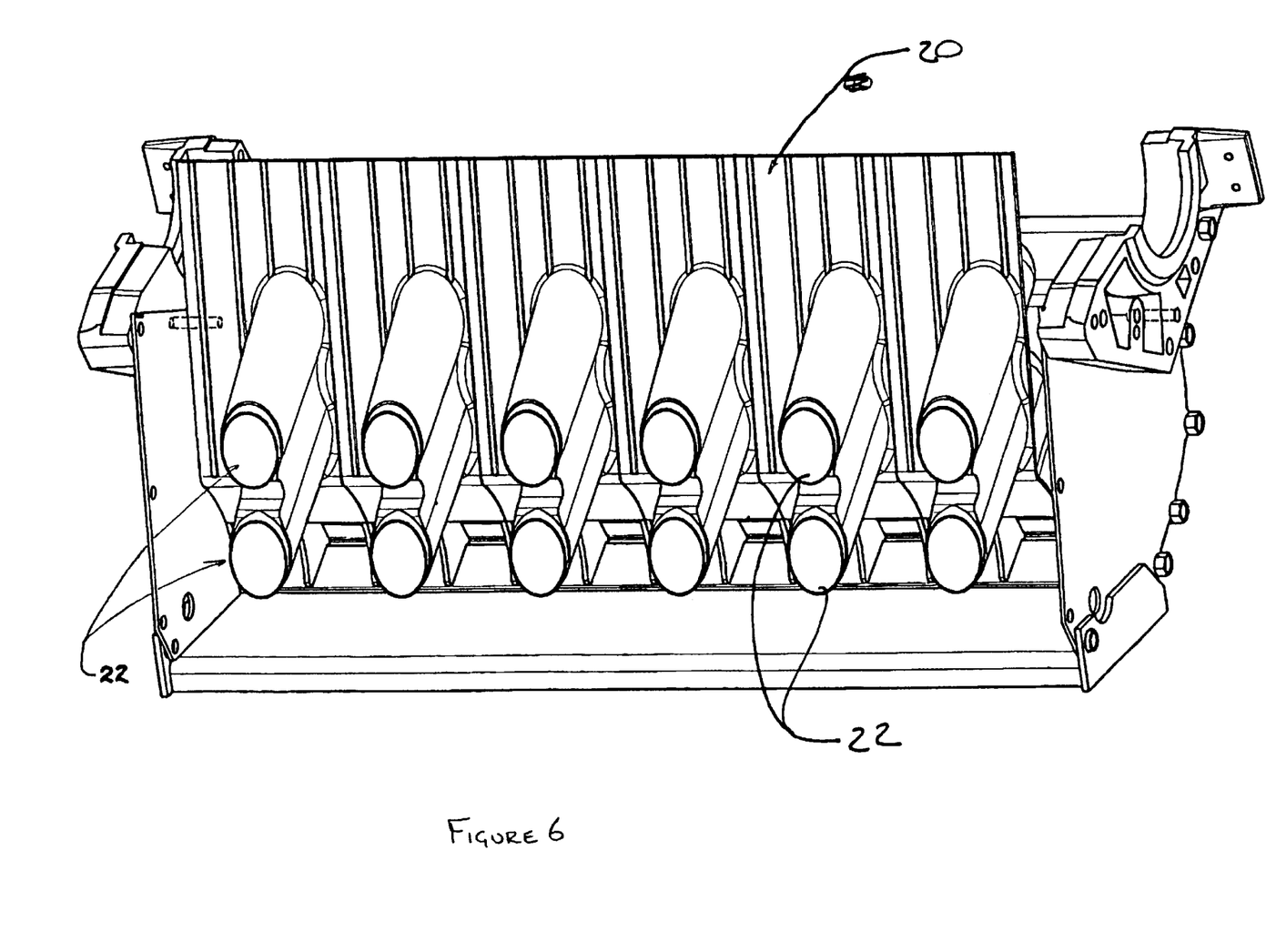
Figure 7:
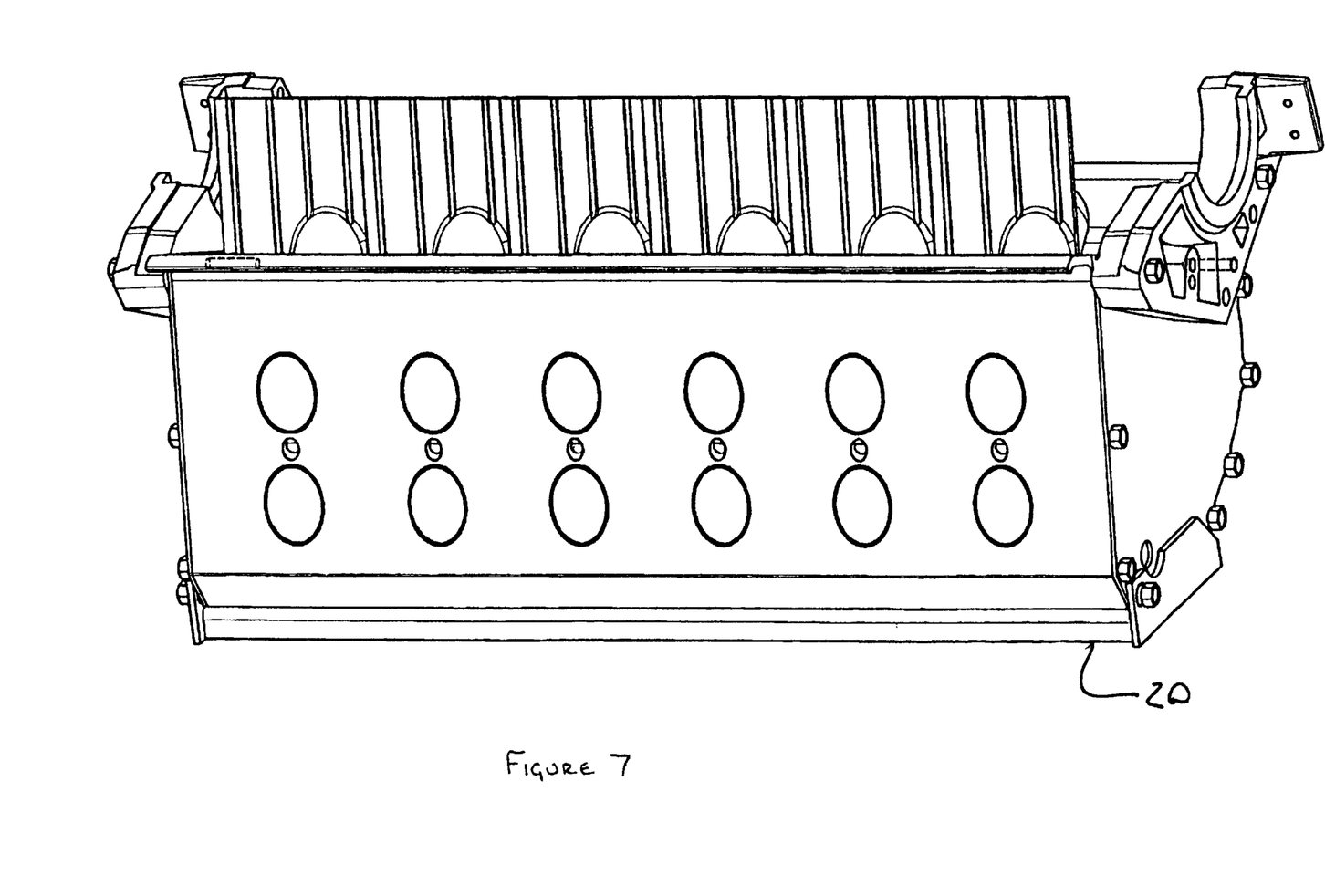
FIG. 7 is a perspective view of the outlet side of the nurse induction unit seen from the exterior of the apparatus.
Figure 8:
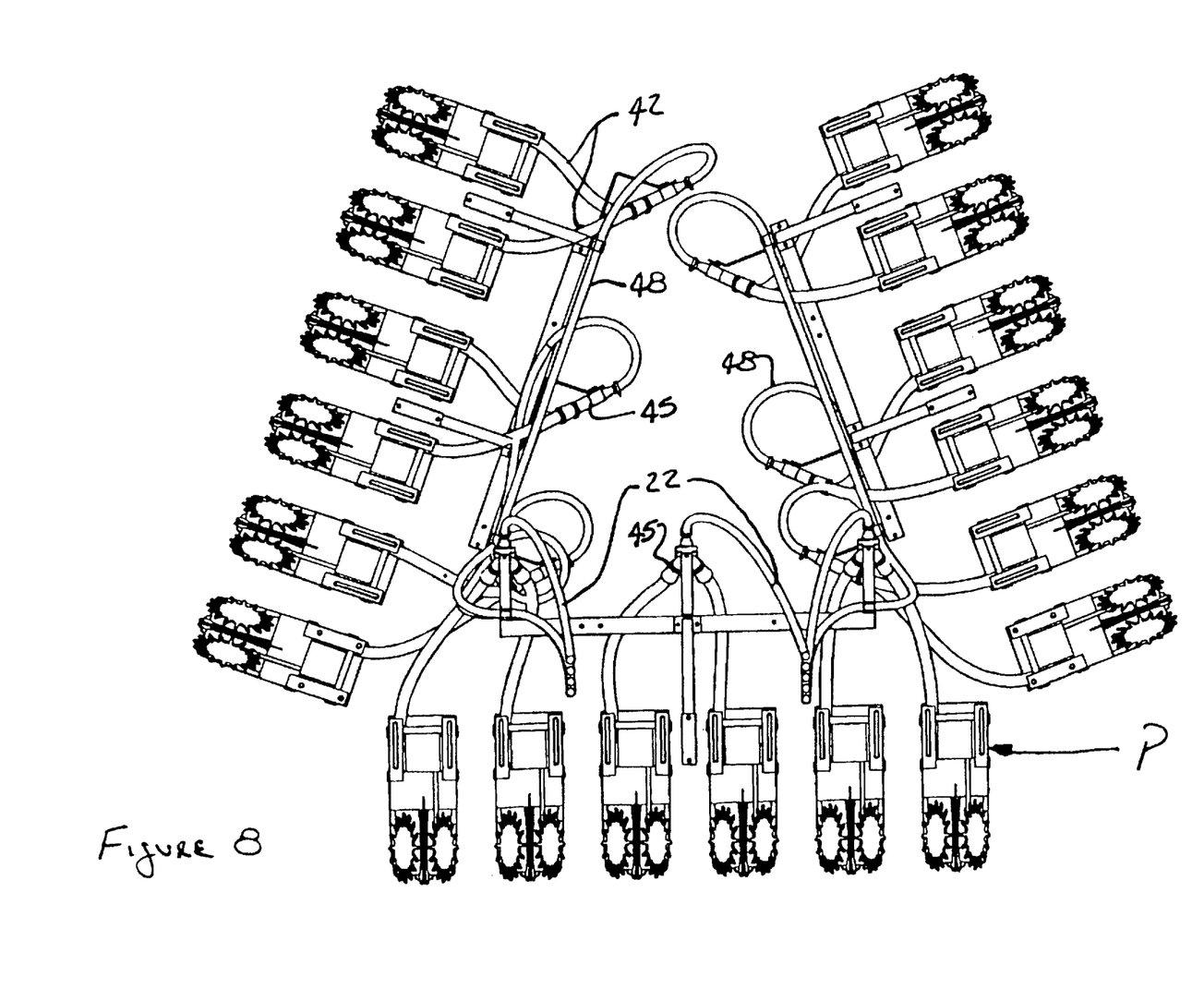
FIG. 8 is a front elevational view of a typical planting mechanism adapted for operative association with the nurse system depicted in FIG. 1 and incorporating the principles of the instant receiver header invention, the side wings of the planting mechanism being folded upwardly relative to the central section to place the planting mechanism in a transport position.
Figure 9:
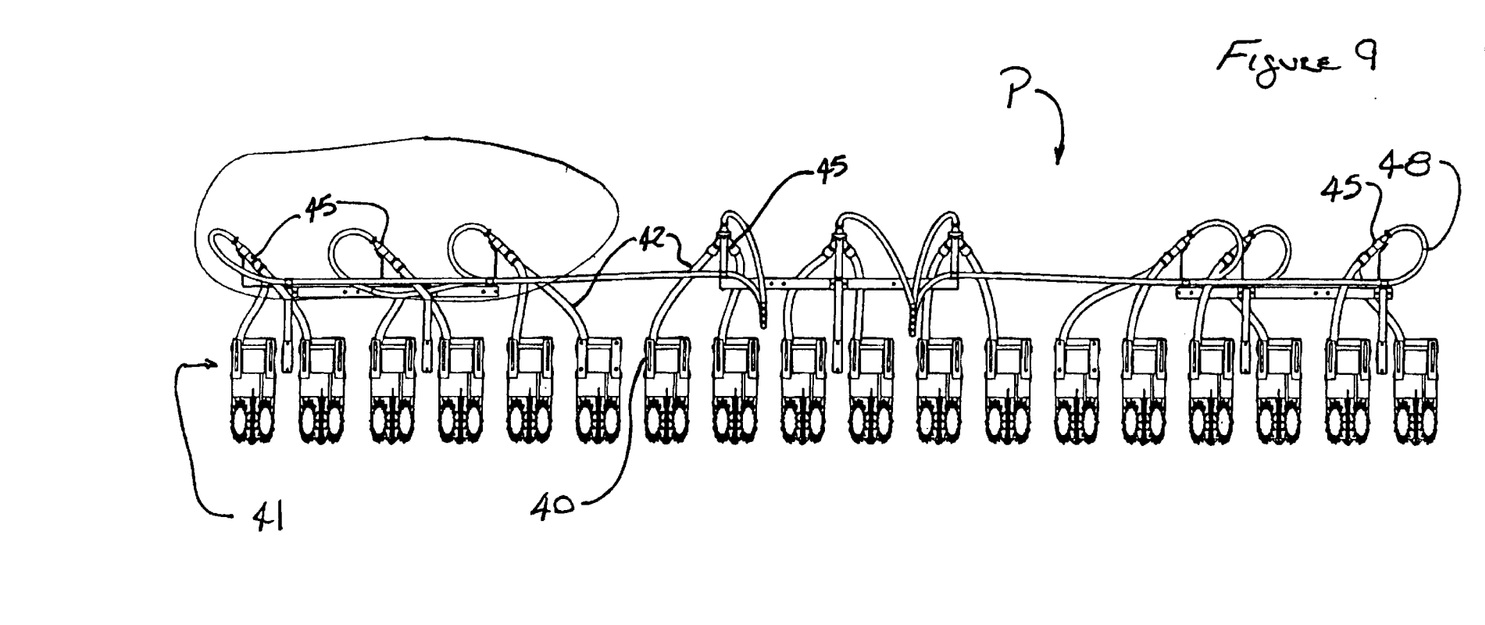
FIG. 9 is a front elevational view of the planting mechanism depicted in FIG. 8 except with the side wing sections being folded down into an operative position.
Figure 10:
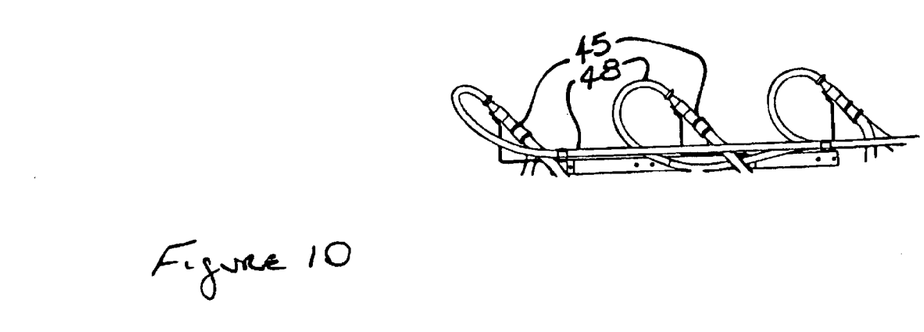
FIG. 10 is an enlarged elevational view of the nurse system receiver apparatus corresponding to the circled mechanism within FIG. 9.

The divider walls 32, that separate the air and entrained seed particle flows to each respective seed distribution tube 22, are sealed such that air cannot get into the seed distribution tubes 22 downstream of the pickup area. The sealed vertical walls 32 also prevent cross over of air and entrained seed to different seed distribution tubes 22. This division of airflow enhances operation since each line is operable to run at different times, depending on demand as represented by the massed seed particles in the output end of the seed distribution tubes 22.

The shape of the air and entrained seed particle flow path has an impact on the performance of the inductor. When the receiver 40 is filled to allow only a small volume of air to flow through the receiver, air alone is still capable of traveling through the lines, through the massed seed particles and past the seed particles at the vent. If seed particles were to be allowed to be induced into the lines with airflows that are less than carrying velocity, a blocking of the seed distribution tubes 22 can occur. This problem of blocking the seed distribution tube 22 can be avoided by forming the portion of the inductor structure, just above the area adjacent to the bottom of the central seed hopper where the individual seed particles are entrained into the airflow, larger so that the air velocity slows down in this region.

With the slowed air velocity, any seed particles that had been entrained into the slow flowing air stream fall out of the airflow and are dropped back into the seed particle mass region. Thus, the seed particles are picked up and carried by the air stream only when the air velocity is above the minimum carry velocity, thereby allowing air to be flowing slowly without transporting any entrained seed particles into the full seed distribution tube. Correspondingly, the cross-sectional area of the seed distribution tubes is smaller than the cross-sectional area between the generally vertical walls dividing, the plenum into discreet channels. As a result, the air velocity increases once entering the seed distribution tube, allowing the seed particle to be retained within the air stream once it enters the seed tube.

The regulator 25 for the flow of seed particles into the area for entrainment within the air stream is defined by a movable gate 29 forming a common edge along which seed particles flow into the particle pick-up area. The product regulator 25 extends across the entire nurse induction apparatus 20. As the seed particles flow under the product regulator, the seed particles form a pile falling naturally at the angle of repose of the seed particles. The angled surface of the pile of seed particles forms the bottom wall of the air channel in the pick-up area. The proximity of the air nozzle 30 to the wall of product affects the amount of product carried in the air stream. As the regulator 25 is rotated and more or less product is permitted to pass through the opening 19*a* at the bottom of the central seed hopper 12, the seed particles fall either closer to or farther from the air nozzle 30. Since different products, such as different seed types, have properties that affect how easily the air stream picks them up, as well as the differences in the angle of repose at which the products slump, the ideal distance between the product surface and the air nozzle varies with the product being distributed. The product regulator 25 is adjustable to enable the optimum distance to be set for each product type, as well as the desired flow rate.

As the air stream 13 strips the product away close to the bottom of the product regulator 25, product from the hopper 12 replenishes the created cavity. The closer to the bottom of the regulator 25 the product is stripped away, the more quickly the product is replenished. Thus, when the regulator 25 is positioned correctly for the specific type of product being nursed, the induction of product into the air stream is relatively steady. During testing, it was found that steady induction of product into the air stream reduced plugging problems within the distribution tubes 22 while maximizing product delivery efficiency.

The product regulator 25 is located on the hopper side of the induction box so that it does not interfere with the seal of the divider walls 32. The product regulator 25 is formed as a single crescent shaped plate 29 that extends across the entire width of the induction unit 20. The regulator plate 19 is attached to a shaft that is rotated by an external handle 28. Thus, the flow of product across the induction box is controlled with the adjustment of a single handle 28. As a result, the flow rate of seed particles can be controlled for all of the tubes 22 simultaneously, and can be completely shut-off to permit clean-out during which process the air will still be guided through the distribution tubes 22 without carrying seed particles. The rotatable regulator plate 19 can be adapted easily for remote control by appropriate actuators connected to the regulator 25. Such a configuration is particularly advantageous in precision farming practices, as the flow of seed particles through the seed distribution tubes 22 can be turned on and off easily. Alternatively, the regulator 25 could be configured to control the flow of air through the nozzle 30 instead of the flow of seeds.

The generally vertical divider walls 32 are constructed such that the nurse inductor apparatus is made in pair segments that are stacked to fit the width of the induction box. The vertical nature of this modular design allows the inductor apparatus to be compact. The modularity of such a design allows the nurse inductor to be easily adapted to different widths and numbers of product lines, including a compact induction box width having a large number of product lines. To allow more space on the particle hopper side of the inductor unit, the distribution tubes 22 forming the outlet pipes are stacked in vertical pairs. The additional space between outlet pipes reduces bridging of the particles as they flow past the pipes and into the region of the product regulator 25. Each distribution tube 22 is independent. The walls 32 dividing the distribution tubes are curved to direct the air and entrained seed particle stream as shown in FIG. 5. The air and entrained seed make relatively small directional changes in the inductor apparatus, which improves the efficiency of the air system. This efficiency enables both the nursing of more than 12 rows and the use of the second air cart tank for simultaneous fertilizer operations.

Figure 1:
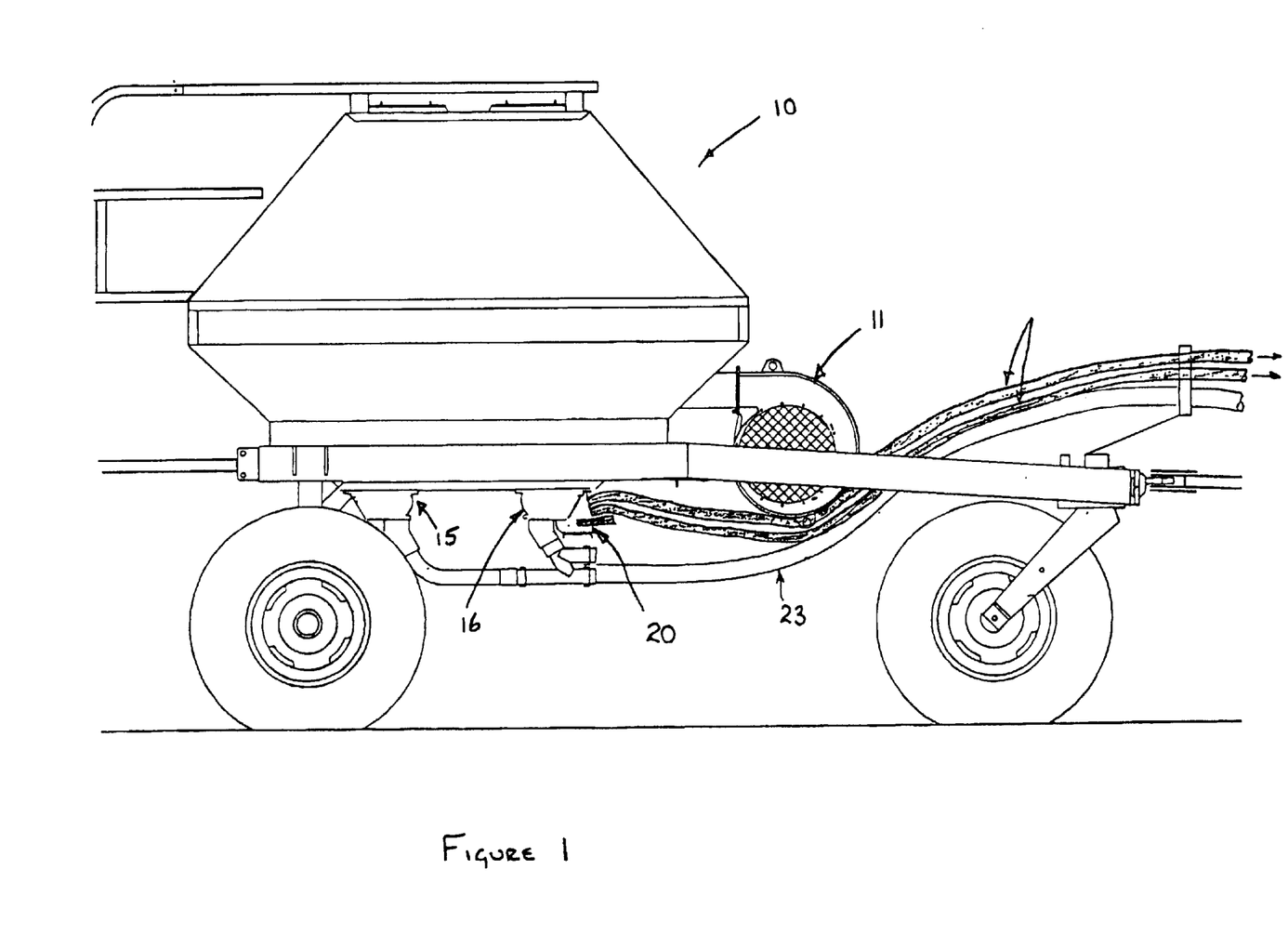
FIG. 1 is a side elevational view of a typical air seeder mechanism on which a nurse induction mechanism incorporating the principles of the instant invention is mounted.
Figure 2:
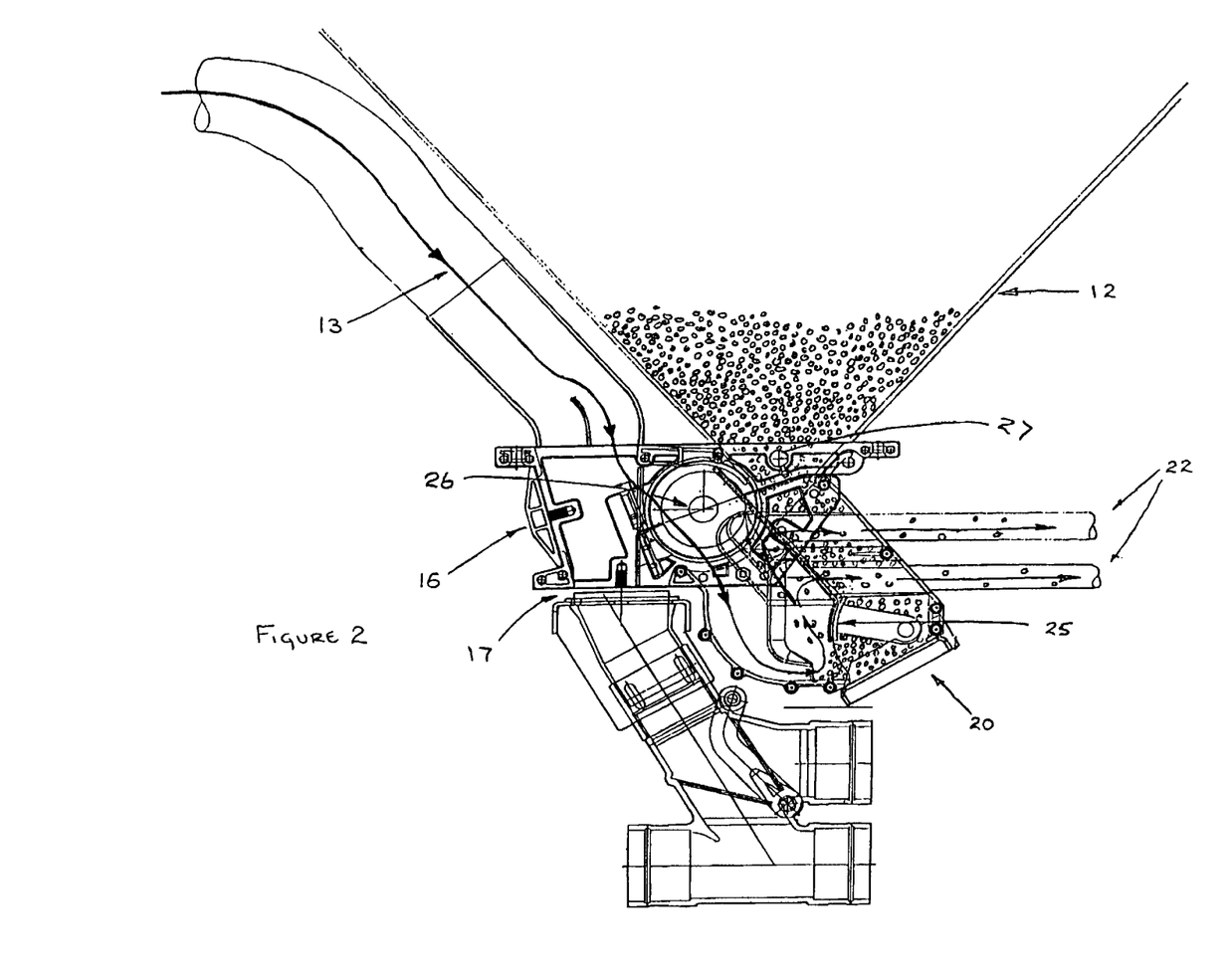
FIG. 2 is a schematic cross-sectional view of the nurse induction system depicted in FIG. 1, the arrows depicting the direction of air flow through the mechanism.

Alternatively, the nurse induction unit 20 is adaptable for use with a stand-alone tank, as well as for with an air cart. Furthermore, the nurse induction unit 20 can also be adaptable to other planter units. As best seen in FIGS. 1 and 2, the nurse induction apparatus is preferably formed as a modular unit that can be inserted into a standard air cart structure to convert the air cart from a straight meter box into a nurse induction box. The conventional air delivery tubes 17 are sealed and remain on the air cart 10, while the nurse induction unit 20 is interposed to receive the air stream 13 from the fan 11. A connection mechanism 16 facilitates the convenient connection of the nurse unit 20 to the air cart 10 as a modular component.

One skilled in the art will recognize that the instant invention is not limited to the conveyance of seed particles, as other particulate matter is commonly distributed through an air cart system, such as fertilizer. Furthermore, the typical air cart 10 is provided with multiple hoppers or tanks containing different product to be planted in the ground. One tank could have seed stored therein, while another tank would have fertilizer and yet another tank could have herbicides or still another reservoir of fertilizer. In such multi-tank configurations, one of the tanks could be provided with a nurse induction unit 20 to convey seeds to the planting devices, while a conventional meter box is used to control the flow of fertilizer or other product to the planting devices by separate distribution tubes. Such a conventional meter box could apply the fertilizer or other product at a variable rate and could be controlled by an electronic controller, as is known for precision farming techniques. Other alternative configurations can include one tank nursing seed to all the singulators, as well as multiple tanks nursing seeds to any one particular singulator.

Referring now to FIGS. 8–18*d*, the nurse system receiver 40 and receiver header 45 can best be seen. The receiver 40 and receiver header 45 are used in conjunction with the nurse inductor system 20, such as the one described above. One skilled in the art will recognize that the header 45 is needed in configurations where the flow is to be split between multiple receivers. The nurse inductor 20 sends an air and entrained particle stream to the receiver 40 when the receiver has less than a desired level of product particles in it. The receiver header 45 is designed to allow air from the air and entrained product particle stream to escape when the particle level is below the air vent, but to limit the amount of air to escape when the particle level is above the air vent 50.

Figure 11:
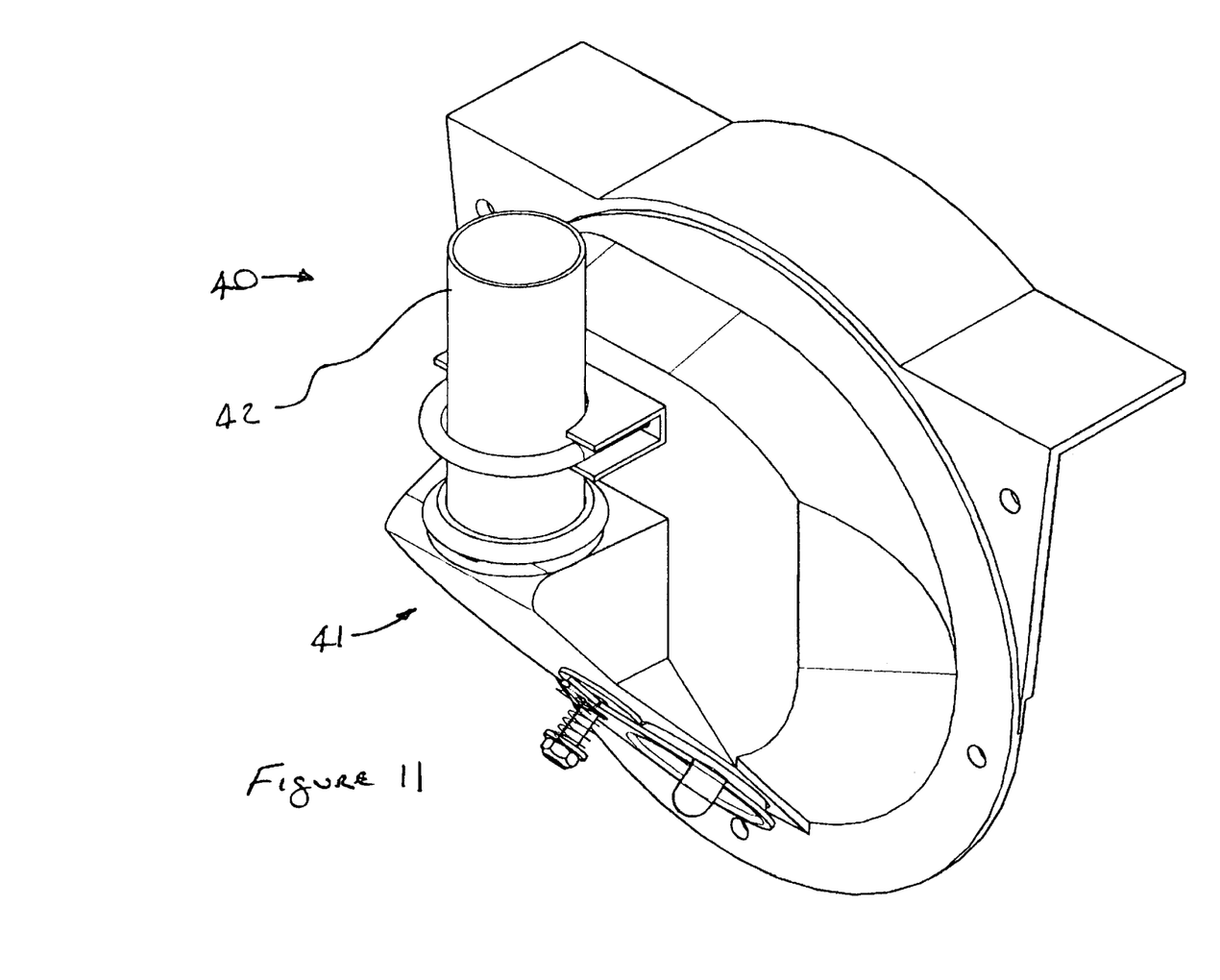
FIG. 11 is an enlarged perspective view of the nurse system receiver assembly.
Figure 12:
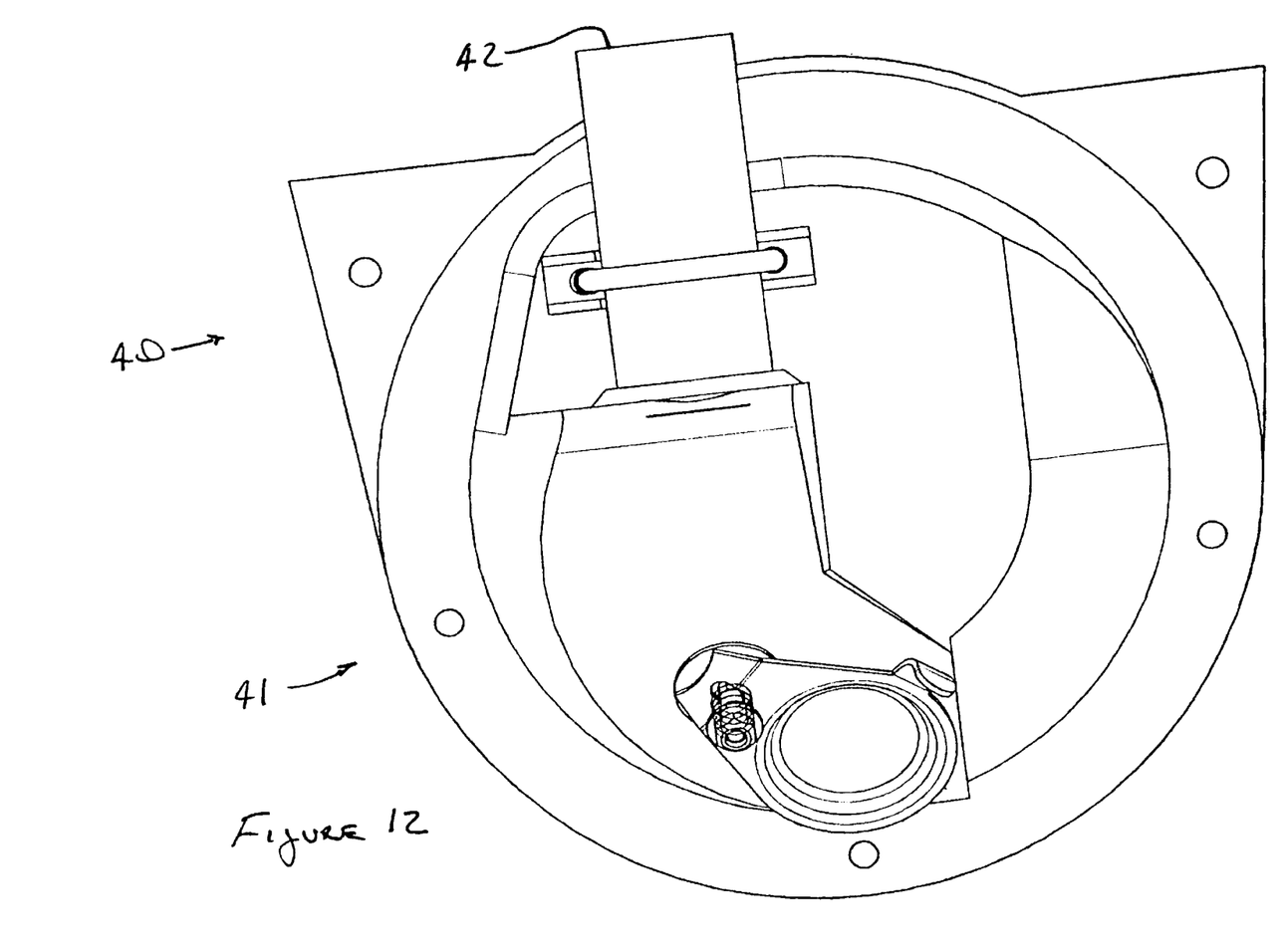
FIG. 12 is an enlarged front elevational view of the nurse system receiver assembly shown in FIG. 11.
Figure 13:
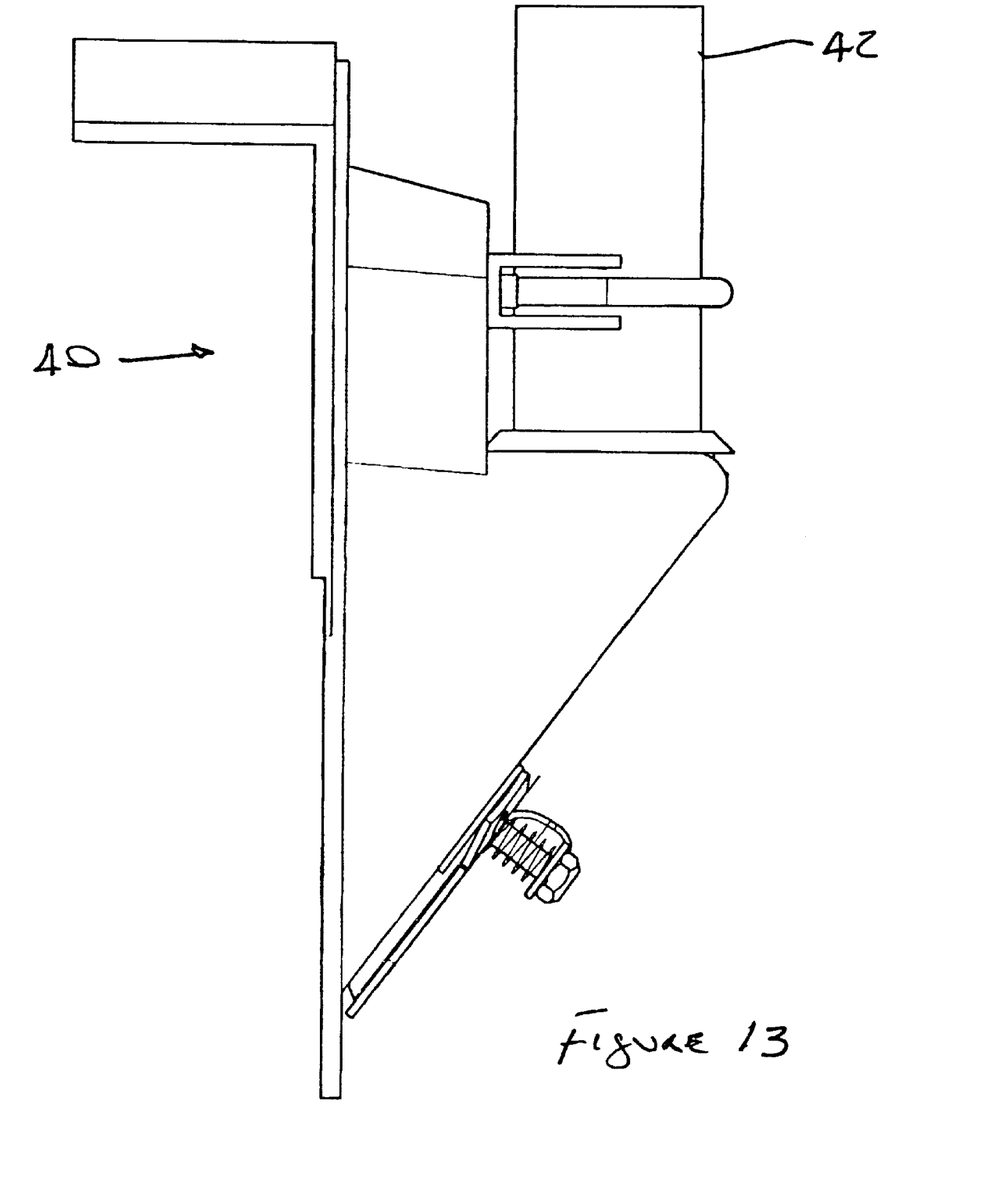
FIG. 13 is an enlarged side elevational view of the nurse system receiver assembly shown in FIG. 12.
Figure 14:
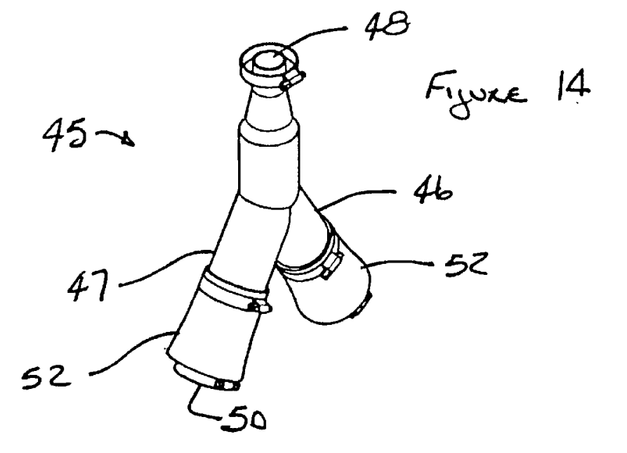
FIG. 14 is a perspective view of the nurse system receiver header assembly.
Figure 15:
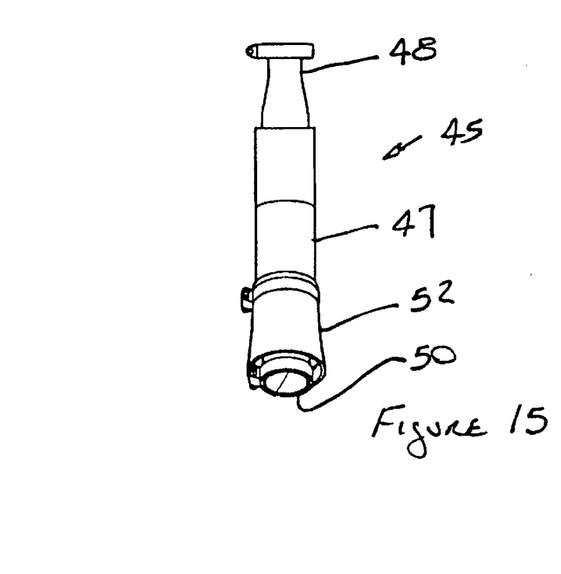
FIG. 15 is a side elevational view of the nurse system receiver header assembly shown in FIG. 14.
Figure 16:
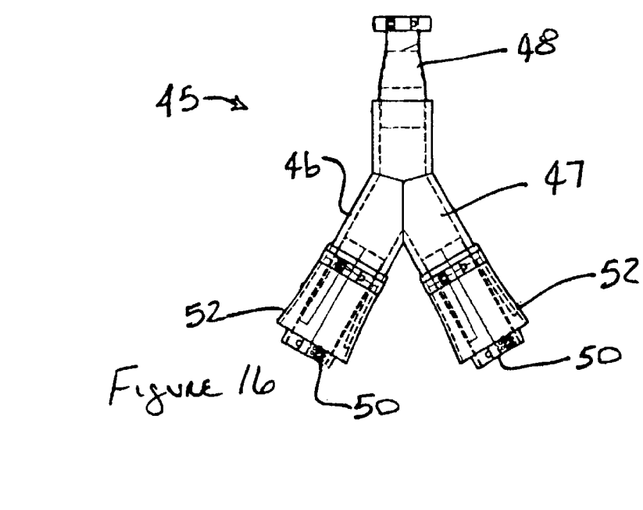
FIG. 16 is a front elevational view of the nurse system receiver header assembly shown in FIG. 14.
Figure 17:
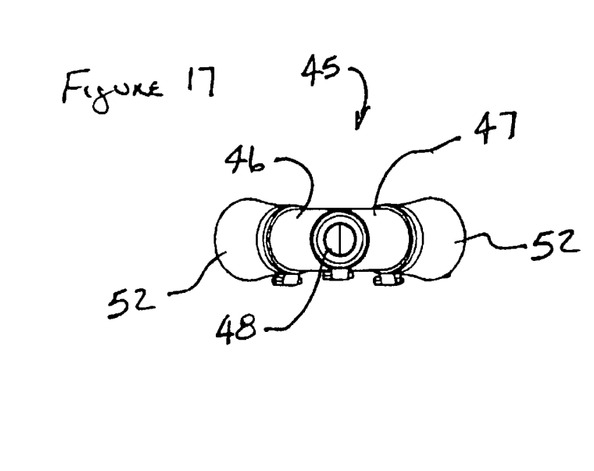
FIG. 17 is a top plan view of the nurse system receiver header assembly shown in FIG. 14.
Figure 18A:
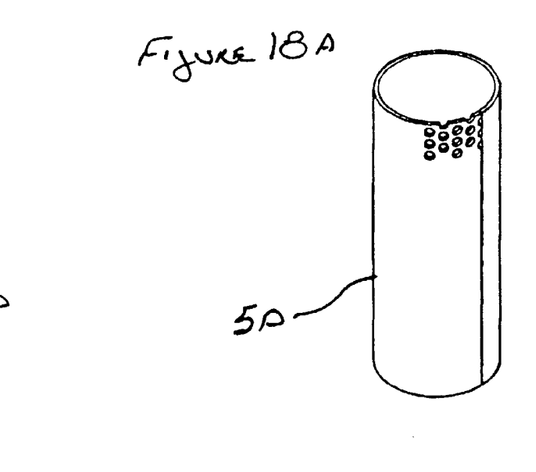
Figure 18B:
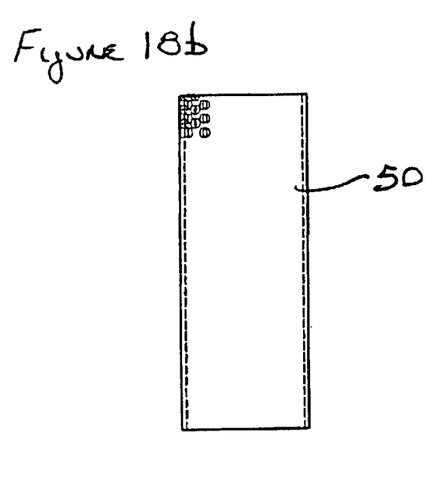
Figure 18C:
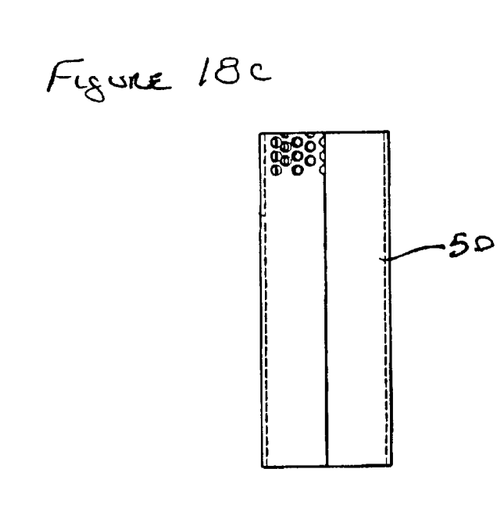
Figure 18D:
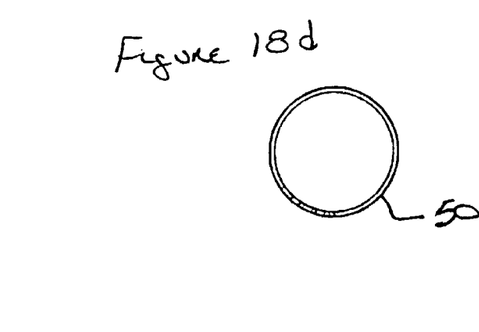

The receiver 40, as shown in FIGS. 11–13, provides a small mass of seeds in the location of the singulator pickup area 41. The seeds S are massed in the receiver 40 and in the line 42 from the receiver 40 up to the receiver header 45, which is the start of the leg 46 in the header Y. When the seeds are accumulated up to the top of the leg 46, they block the flow of air through the air vent 50 near the header bottom. When the air does not flow freely through the air vent 50, the flow of particles from the nurse inductor unit diminishes as described above. Only the small flow of air that can escape through the particles and vent 50 will continue to flow. This airflow is too low to entrain or pick-up particles.

If only one leg 46 of the Y is full, particles will continue to be nursed into the empty leg 47 until the air vent 50 is covered in the second leg 47 also. Then, the airflow to the header 45 will drop off and particles will not be sent in the nurse line 22 until such a time that one of the receivers 40 is emptied below the level where its air vent 50 is free. The nurse line 22 leading to the receiver header 45 is smaller than the lines 42 between the header 45 and the receiver 40 to reduce the velocity of the air flow at the receiver header 45, thus allowing the entrained seed particle to drop out of the air stream and fall be gravity to the receiver 40. To stop blocking of particles in the nurse line 22, the receiver header 45 is mounted such that the inlet line 48 is always vertically above the outlet lines 42, regardless of the implement position. As best seen in FIGS. 8–10, the header 45 is mounted such that it sits at an angle inclined to the vertical in operating position. The mounting of the header 45 also permits the header 45 to be moved through vertical to an opposite angle to the vertical in the transport position, which typically involves the rotation of the header through an angle in the range of 70 to 110 degrees, or approximately 90 degrees. The header 45 never inverts to allow particles to flow out of it back down the nurse line 22 which would cause plugging. The header mount design enables folding of the planter P into transport with full receivers 40. The header 45 never inverts, so the seed particles S stay in the receivers 40 when the planter P is moved between transport and operative positions.

The vent hood 52 makes a roof over the vent 50 to allow the air to be vented out and guard against rain and contaminants getting in. The orientation of the receiver header 45 always keeps the hood 52 opening facing down, even when the toolbar is rotated into transport. Other embodiments may use receiver headers 45 that are single or triple, or other variations. It is also possible that the vent and rain guard may be incorporated directly into the receiver design if a separate header is not desirable. The single design would be mounted at an angle to provide a similar function to trap seed particles when moving into and out of transport. The single design would also preferably incorporate the vent and rain hood in a manner similar to the double configuration described above. Since the single configuration would feed only a single receiver, it would be desirable to mount the header directly onto the receiver or to incorporate the header into the receiver design. The triple configuration would be similar to the double configuration described above with the addition of one single leg.

The nurse inductor 20 enables the use of a standard air cart 10 for both the central hopper and the nurse system air source. The air cart fan can be used for both fertilizing and nursing operations simultaneously. The inductor 20 can be designed in an adapter arrangement, which enables the air cart 10 to be readily converted from a roller type metering system to the nurse inductor system, and vice versa. The change to the cart to enable nurse induction is not permanent and does not require the use of time-consuming threaded fasteners.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A seeding implement comprising:

a mobile frame adapted for movement over the ground;

a mechanism mounted on said mobile frame for creating and channeling a stream of air;

a hopper supported on said mobile frame for carrying a supply of seed particles, said hopper having a discharge opening for the passage of said seed particles; and a nurse inductor mechanism mounted on said hopper to receive seed particles therefrom and to receive said air stream, said nurse inductor mechanism including:

a generally transverse partition wall dividing said nurse inductor into a seed side and an air side, said seed side receiving and holding a supply of seed particles from said hopper;

a passageway at a bottom portion of said nurse inductor mechanism defined by said partition wall for the passage of said seed particles from said seed side to said air side;

a plurality of discharge tubes, each having an inlet opening in flow communication with said air side;

a plurality of divider walls dividing said air side into a plurality of channels corresponding to said plurality of said discharge tubes, said divider walls isolating each respective said discharge tube from each other discharge tube; and a serpentine flow path for said air stream including a bend adjacent said passageway to create turbulence to facilitate an entrainment of individual seed particles into said air stream.

2. The seeding implement of claim 1 further comprising an additional hopper supported on said mobile frame for carrying a supply of non-seed product, said additional hopper having a meter box associated therewith to meter said non-seed product into a separate airstream simultaneously with the operation of said nurse inductor mechanism.

3. The seeding implement of claim 2 wherein each said channel has a cross-sectional area greater than a cross-sectional area of said inlet opening of the corresponding said discharge tube so that the velocity of said air stream increases upon entering said discharge tube, allowing said entrained seed particle to be carried within said air stream until reaching said remote planting mechanism.

4. The seeding implement of claim 3 wherein said nurse inductor mechanism further includes a regulator cooperatively associated with said passageway to control the size of said passageway and the rate of flow of said seed particles from said seed side to said air side.

5. The seeding implement of claim 4 wherein said discharge tubes are arranged in generally vertically stacked pairs, said discharge tubes being sufficiently spaced to permit said seed particles to pass between said discharge tubes, each said stacked pair of discharge tubes forming a module.

6. The seeding implement of claim 5 wherein said nurse inductor mechanism is detachably mountable on said hopper to be able to convert said hopper between a meter box and a nurse inducting box.

7. A method of planting crops in the ground, comprising the steps of:

nursing seed particles to a planting mechanism having a singulator for placing said seed particles into the ground at a predetermined spacing; and simultaneously with said nursing step, metering non-seed material to said planting mechanism for placement into the ground independently of said seed particles.

8. The method of claim 7 wherein said nursing step includes the step of:

supplying said seed particles from a first tank into a nurse inductor mechanism that induces the flow of said seed particles through seed distribution lines to a receiver at said planting mechanism as said sed particles are required at said planting mechanism.

9. The method of claim 8 wherein said metering step includes the step of:

supplying said non-seed material from a second tank into a metering mechanism that meters te flow of said non-seed material into a stream of air constrained within a conduit to direct a substantially continuous supply of said non-seed material as said planting mechanism is operating.

10. In an agricultural seeding implement having a frame adapted for movement over the ground; a first hopper supported on said frame for carrying a supply of seed particles, said first hopper having a lower portion including a first discharge opening through which seed particles pass to exit said first hopper; a second hopper supported on said frame for carrying a supply of non-seed material, said second hopper having a lower portion including a second discharge opening through which non-seed material passes to exit said second hopper; a mechanism supported on said frame for creating a flow of air through an air distribution system; and a planting mechanism for planting said seed particles and said non-seed material into the ground, the improvement comprising:

a nurse inductor mechanism supported on said first hopper to communicate with said first discharge opening and said air distribution system to induce a flow of seed particles through a seed distribution line to a receiver on said planting mechanism to hold a limited supply of said seed particles; and a metering mechanism supported on said second hopper to communicate with said second discharge opening and said air distribution system to provide a continuous supply of said non-seed material through a material distribution line to said planting mechanism as said planting mechanism is operated to plant said seed particles in the ground.

11. The agricultural seeding implement of claim 10 wherein said nurse inductor mechanism induces said flow of seed particles to said receiver only as said receiver is being depleted from the planting of said seed particles into the ground.

12. The agricultural seeding implement of claim 11 wherein said planting mechanism includes a singulator that places said seed particles in the ground at a substantially regular spacing, said non-seed material being placed into the ground by said planting mechanism at a generally continuous rate.

13. The agricultural implement of claim 12 wherein said air distribution system provides a flow of air from said mechanism for creating a flow of air to both said nurse inductor mechanism and said metering mechanism for the movement of said seed particles and said non-seed material, respectively, to said planting mechanism.

14. The agricultural implement of claim 13 further comprising a plurality of metering mechanism mounted on corresponding hoppers supported on said frame to provide a corresponding number of metered flows of non-seed materials to said planting mechanism through said material distribution line.

* * * * *